US006903531B2

(12) United States Patent
Suomi et al.

(10) Patent No.: US 6,903,531 B2
(45) Date of Patent: Jun. 7, 2005

(54) CIRCUIT FOR DRIVING A STEPPER MOTOR AND METHOD OF CONTROLLING A STEPPER MOTOR DRIVER

(75) Inventors: Eric W. Suomi, Madison, WI (US); Thomas M. Stankey, Sun Prairie, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 10/656,517

(22) Filed: Sep. 5, 2003

(65) Prior Publication Data

US 2005/0052152 A1 Mar. 10, 2005

(51) Int. Cl.⁷ .............................................. H02P 8/00
(52) U.S. Cl. ...................... 318/696; 318/685; 318/560
(58) Field of Search ................................ 318/560, 685, 318/696, 687, 138, 139, 701, 599, 811, 801; 388/829, 801, 811; 363/41

(56) References Cited

U.S. PATENT DOCUMENTS

| | | | |
|---|---|---|---|
| 4,087,732 A | | 5/1978 | Pritchard |
| 4,581,565 A | | 4/1986 | Van Pelt et al. |
| 4,931,712 A | | 6/1990 | DiGiulio et al. |
| 5,225,756 A | | 7/1993 | Coutu |
| 5,231,343 A | | 7/1993 | Nakamura |
| 5,440,214 A | | 8/1995 | Peeters |
| 5,450,521 A | | 9/1995 | Redlich |
| 5,459,432 A | * | 10/1995 | White et al. ................ 329/307 |
| 5,519,601 A | | 5/1996 | Close et al. |
| 5,572,105 A | | 11/1996 | Nojima et al. |
| 5,936,371 A | | 8/1999 | Bolash et al. |
| 5,977,737 A | | 11/1999 | Labriola, II |
| 6,348,775 B1 | | 2/2002 | Edelson et al. |
| 2002/0097016 A1 | | 7/2002 | Tanaka et al. |

OTHER PUBLICATIONS

SGS–Thomson Microelectronics, "DMOS Full Bridge Driver," descriptions and diagrams, Jul. 1997.
Whitis, Mark, "Basic Stepper Motor Driver Schematic," 1999.
New Japan Radio Co., Ltd., "Microstepping," descriptions and diagrams, http://www.njr.co.jp/pdf/ee/ee05005.pdf.
Laidman, Russell, "Part III—Current Control for Stepper Motors," 2001, http://209.41.165.153/stepper/Tutorials/MicroTutor.htm.
http://hyperphysics.phy–astr.gsu.edu/hbase/electronic/xor.html, "Exclusive OR Gate," concept map, Jan. 14, 2001.
http://hyperphysics.phy–astr.gsu.edu/hbase/electronic/and.html, "AND Gate," concept map, Mar. 5, 2001.
Jones, Douglas W., "Control of Stepping Motors, A Tutorial," Section 5, 1995, 1998, The University of Iowa Department of Computer Science, http://www.cs.uiowa.edu/~jones/step/micro.html.

* cited by examiner

Primary Examiner—Karen Masih
(74) Attorney, Agent, or Firm—Greer, Burns & Crain, Ltd.; Philip M. Kolehmainen

(57) ABSTRACT

A driver circuit is provided for a stepper motor which utilizes a processor that outputs a PWM signal. The driver circuit includes an H-bridge circuit having first and second inputs, and a switching circuit having an input and an output. The first H-bridge input and the switching input connect to the PWM signal output from the processor, and the switching output connects to the second H-bridge input. The switching circuit performs an inversion of a duty cycle of the PWM signal when the PWM signal is present, and a non-inversion of the duty cycle when the PWM signal is not present.

28 Claims, 4 Drawing Sheets

CIRCUIT FOR DRIVING A STEPPER MOTOR AND METHOD OF CONTROLLING A STEPPER MOTOR DRIVER

BACKGROUND OF THE INVENTION

The present invention relates to stepper motors systems in general, and more specifically to an improved circuit for driving a stepper motor and a method of controlling the circuit and driver.

Stepper motor systems and drivers are known in the art. Conventional stepper motor systems include a stepper motor and a driver for the motor, the motor driver typically including an H-bridge circuit. FIG. 1 illustrates a conventional circuit 10 for driving a stepper motor.

An analog voltage signal is fed into a voltage-to-duty-cycle converter 12, which is clocked by an oscillator 14. An output of the converter 12 is then fed into a first input 18 of a first AND gate 20, and into a first input 22 of a second AND gate 24. A phase signal is fed into second respective inputs 26, 28 of the first and second AND gates 20, 24. The phase signal into the second input 26 is first passed through an inverter 30. An output of the first AND gate 20 is then fed into an input 32 of an H-bridge first half 34, and an output of the second AND gate 24 is fed into an input 36 of an H-bridge second half 38. Respective outputs of the H-bridge halves 34, 38 drive motor windings 40.

The conventional circuit 10 functions to change a current in the motor windings 40 by actively selecting successive coil currents, one after the other, in a sinusoidal manner, to drive the motor by a series of discrete microsteps. At any given moment, a selected coil current is actively controlled via a separate integrated circuit (not shown). The integrated circuit dynamically achieves a desired coil current by using a closed-loop control and a feedback of the motor coil current. Conventional stepper motor drive circuits thus are generally closed-loop systems with respect to where they connect to a stepper motor. Such conventional circuits experience several disadvantages in operation.

One disadvantage experienced by the conventional circuit 10 is noise. At certain micro-step values, a sampling nature of pulse width modulation ("PWM") generation gives rise to audible sub-harmonics of the oscillator 14. Imprecise frequency control of the oscillator causes an undesirable audible frequency jitter, or "fizzing." Furthermore, long wires in the feedback network connected to the stepper motor windings cause an undesirable electrical ringing noise, which can also occur audibly.

Another disadvantage experienced by the circuit 10 occurs when the phase control is switched. Ideally, the phase should be switched when the current through the motor windings 40 is zero. However, at typical operating speeds of the motor, there is always at least a finite amount of current flowing through the windings 40 due to the inductive nature of the windings. Switching the current polarity when the current is not actually zero causes a shaft of the motor (not shown) to rotate in a non-uniform manner. The non-uniform rotation results in an increased vibration in the motor, which further increases the audible noise experienced.

Still another disadvantage experienced with the circuit 10 rises out of the fact that H-bridges experience a "dead zone" when the voltage driving the motor windings 40 crosses through zero. The dead zone causes a noticeable and undesirable pause of the motor motion at slow shaft speeds. The pause results in a jerky shaft rotation of the motor, which makes precise positioning of the motor shaft difficult to impossible at a dead zone location. The dead zone crossings also further increase the generated noise experienced by the motor.

An example of a method to reduce noise from a stepper motor is described in patent to Peeters, U.S. Pat. No. 5,440,214. Peeters describes a voltage PWM drive which generates a sinusoidal drive signal using PWM timing, approximating a sine wave using discrete levels. Straight line coding of each PWM timing step is implemented in a central processing unit ("CPU") to generate an approximate PWM pulse corresponding to the desired sine waveform. Peeters uses a single drive speed for quiet operation, and a closed-loop feedback system to dynamically measure and control the stepper motor.

Although useful for balancing the duty cycle of the PWM signal, the discrete, single-speed operating method described by Peeters is unable to compensate for different, or variable, operational drive speeds. This method is also unable to compensate for dead zone anomalies within a drive step, and therefore cannot accurately position the motor at lower drive speeds, where the inertia of the system is weaker, and thus unable to mask the dead zone anomalies.

A different stepper motor driver circuit is described in a patent to Labriola, U.S. Pat. No. 5,977,737. Labriola employs an H-bridge driving circuit, and controls the circuit using a closed-loop feedback system which utilizes a predicted motor current value. The predicted motor current is calculated on the basis of empirically-derived characteristics of the motor itself, and measured values for the motor angular velocity and physical angle. Similar to Peeters though, Labriola also requires dynamic measurements of some variables with a closed-loop feedback system that can produce undesirable noise.

Accordingly, it is desirable to construct a driver circuit for a stepper motor system which reduces the operational noise of the motor, while also avoiding the problems associated with closed-loop feedback, dead zone anomalies, and switching the current-limited waveform. The desired circuit should be operational for a continuous range of rotational speeds of the motor shaft.

SUMMARY OF THE INVENTION

The above-listed objects are met or exceeded by the present driver circuit for a stepper motor system. Major advantages of this circuit include an open-loop system, and a switching circuit which can provide both PWM phase inversion and PWM loss protection through the hardware of the circuit itself. The driving method for the motor additionally corrects for significant anomalies experienced by conventional motor systems.

More specifically, the present invention provides a driver circuit for a stepper motor which utilizes a processor that outputs a PWM signal. The driver circuit includes an H-bridge circuit having first and second inputs, and a switching circuit having an input and an output. The first H-bridge input and the switching input connect to the PWM signal output from the processor, and the switching output connects to the second H-bridge input. The switching circuit performs an inversion of a duty cycle of the PWM signal when the PWM signal is present, and a non-inversion of the duty cycle when the PWM signal is not present.

In another embodiment, a stepper motor system is provided and includes a stepper motor, a motor driver circuit to drive the stepper motor, a switching circuit, and a processor. The motor driver circuit has first and second driver inputs, and the switching circuit has a switching input and a switching output. The switching input connects to the first driver input, and the switching output connects to the second driver input. The processor outputs a PWM signal to the first driver input and the switching input, and the switching circuit functions as an inverting circuit when the PWM signal is present, and as a buffer circuit for the motor driver circuit when the PWM signal is not present.

In a further embodiment, a method for driving a stepper motor having a motor driving circuit is provided. The method predicts a rotational acceleration of a rotatable shaft of the motor, and computes a shaft rotational position based on the predicted shaft acceleration. A present deviation value of the computed shaft position is then predicted based on the computed shaft position. A rotational speed of the motor shaft is also computed based on the predicted shaft acceleration, and the predicted present deviation value is then adjusted based on the computed shaft speed. The adjusted deviation value is corrected for a zero-crossing anomaly, and then output to the motor driving circuit.

Under normal motor loads and standard driving speeds, the present invention is particularly effective at eliminating operational noise from the motor, while also allowing the motor to operate smoothly over a continuous range of operational speeds.

DETAILED DESCRIPTION OF THE INVENTION

Figure 1:
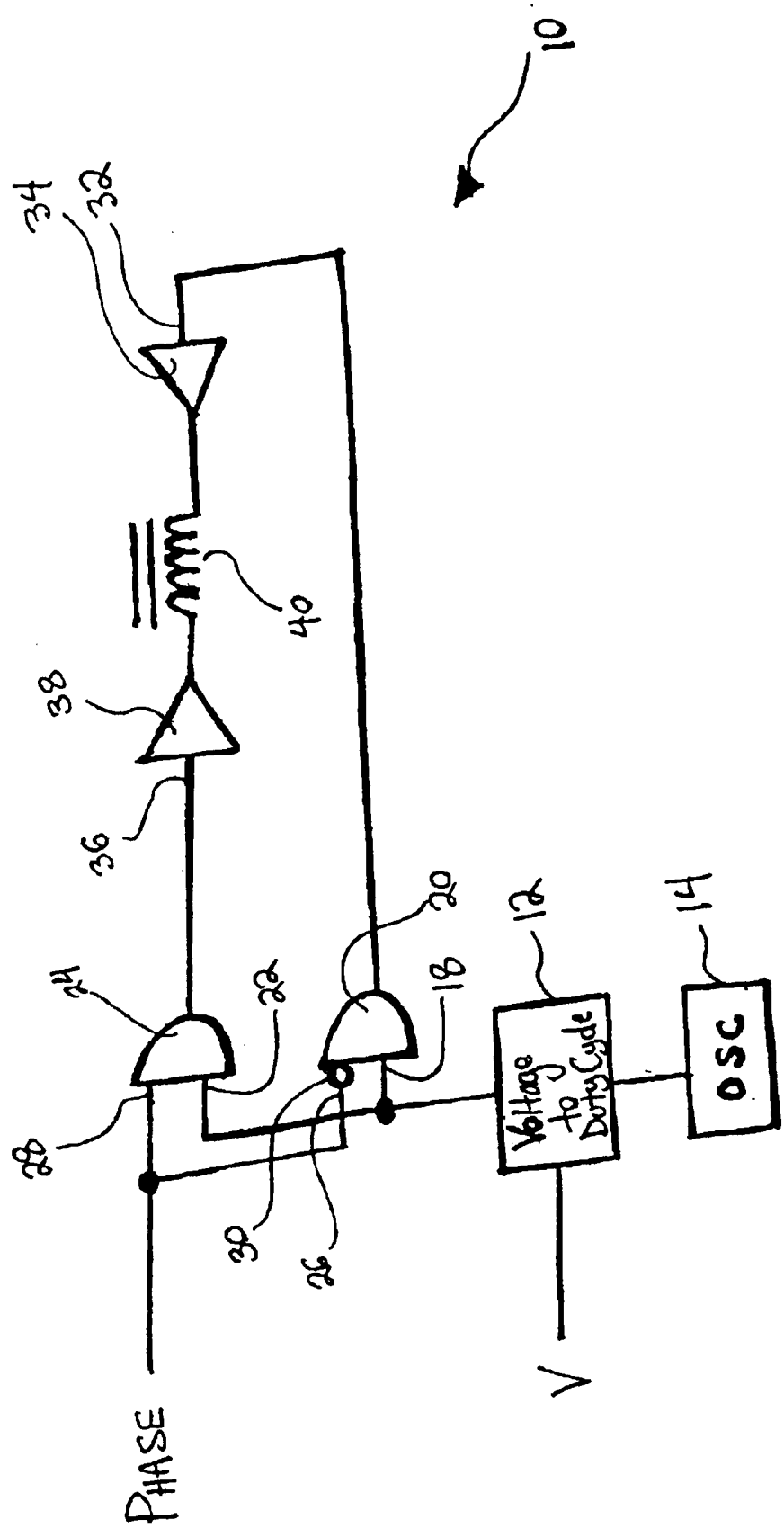
FIG. 1 is a schematic diagram of a conventional driver circuit.
Figure 2:
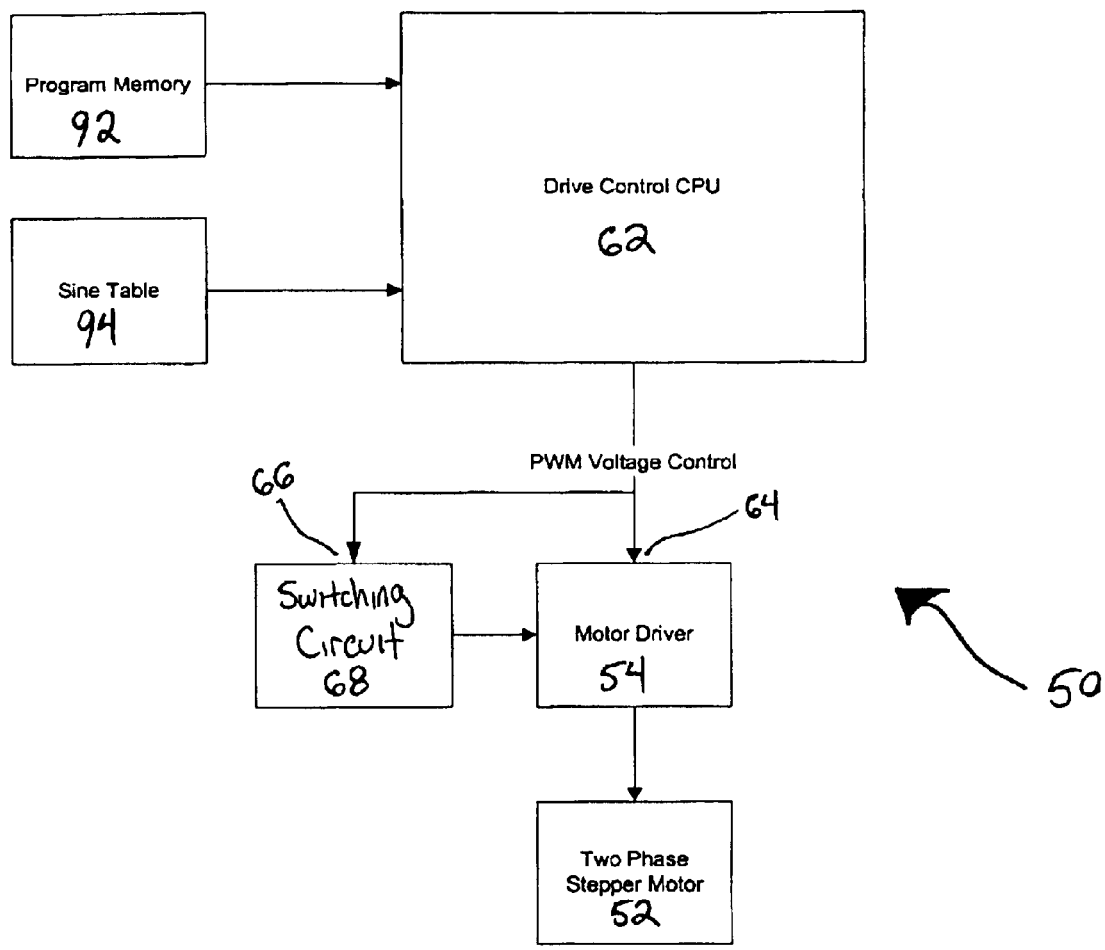
FIG. 2 is a block diagram of a stepper motor system according to an embodiment of the present invention.
Figure 3:
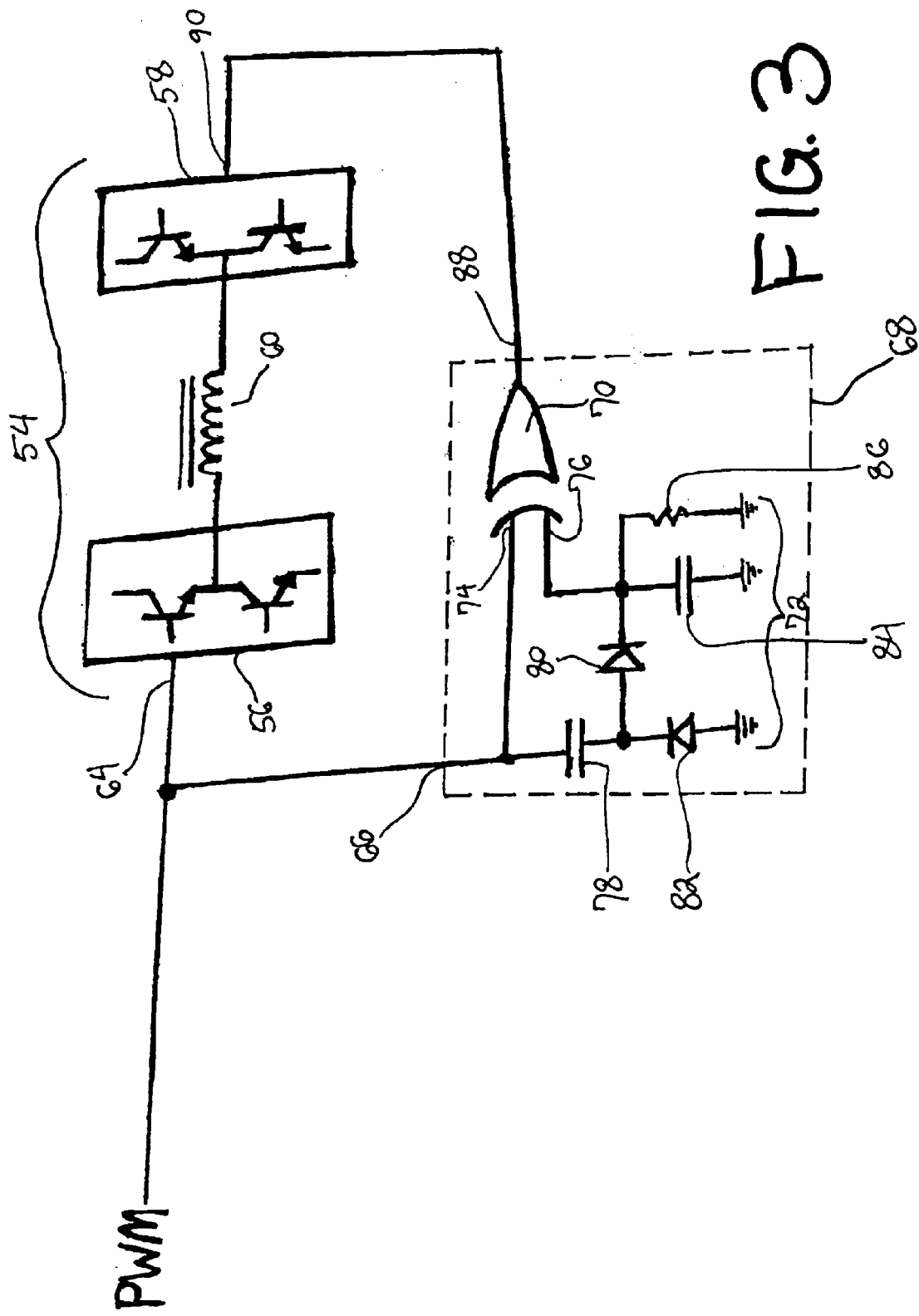
FIG. 3 is a schematic diagram of the switching circuit illustrated in FIG. 2.

Referring now to FIGS. 2 and 3, a stepper motor system of the type suitable for use in the present invention is generally designated 50, and includes a stepper motor 52 and a motor driver 54 for driving the stepper motor. The stepper motor 52 is preferably a two-phase motor, and the motor driver 54 is preferably an H-bridge circuit, as are known in the art. The motor driver 54 includes separate first and second drivers 56 and 58, respectively, for driving both respective ends of a motor winding 60 of the two-phase motor 52. A PWM voltage control signal is applied directly from a drive control CPU 62 to an input 64 to the first driver 56 of the motor driver 54, as best seen in FIG. 3.

The same PWM signal is also applied directly from the CPU 62 to an input 66 of a switching circuit 68. The switching circuit 68 preferably includes an exclusive OR gate 70 and a charge pump 72 as its main components. A first input 74 of the exclusive OR gate 70 connects directly to the switching circuit input 66, and thus the applied PWM signal as well. The first input 74 of the exclusive OR gate 70 connects to a second input 76 of the exclusive OR gate through a series connection of an input capacitor 78 and a first steering diode 80, which are both portions of the charge pump 72. The remainder of the charge pump 72 preferably includes a second steering diode 82 connected between ground and the connection of the first input capacitor 78 to the first steering diode 80, and an output capacitor 84 and a bleeder resistor 86 both connected between the second exclusive OR gate input 76 and ground in parallel. An output 88 of the exclusive OR gate then preferably connects directly to an input 90 of the second driver 58.

Drive control software to operate the motor driver 54 and the switching circuit 68 is executed by the CPU 62 from a program memory 92. A sine waveform for the motor driver 54 is stored in a sine table 94, which may be a part of the program memory 92, or a separate memory component accessible by the CPU 62 (FIG. 2). The drive control software and the operation of the CPU 62 and memory components are further discussed below with respect to FIG. 4.

The switching circuit 68 advantageously can perform several functions for the motor driver 54. According to this preferred circuit configuration, the switching circuit 68 functions as a PWM phase inversion circuit for each of the first and second drivers 56, 58, driving either end of the motor winding 60 out of phase with its other end when the PWM signal is present. A PWM signal is considered to be present when it provides a switching at a periodic rate, along with an associated duty cycle. The switching circuit 68 also functions as a PWM loss protection circuit, which will disable the motor driver 54 when no PWM signal is present. By disabling the motor driver 54, large, excessive currents can be prevented from flowing through the motor driver and the stepper motor 52.

Instead of switching the direction of the H-bridge (that is, the direction a current would flow in a motor winding connected to the H-bridge) every sine wave half cycle, as conventionally done, the present invention operates to switch the direction of the H-bridge at a much higher frequency, preferably 19.5 kHz. A frequency of 19.5 kHz is low enough to allow for a maximum number of steps to approximate a pure sine waveform, but still high enough to be beyond the audible range of human hearing. The duty cycle of the 19.5 kHz switching waveform is thus used to control both the direction and the magnitude of the current in the motor windings. A 50 percent duty cycle of the 19.5 kHz direction control waveform then preferably corresponds to a coil current of zero. Similarly, a zero percent duty cycle would then correspond to a maximum winding current in one direction, and a 100 percent duty cycle would then correspond to a maximum winding current in the other direction.

The present invention produces a sinusoidal current in the stepper motor windings 60 by varying the duty cycle of the 19.5 kHz H-bridge switching waveform in a sinusoidal manner, where a 50 percent duty cycle also represents zero voltage across the windings. The amount of duty cycle sinusoidal deviation ("swing") from 50 percent then corresponds to an amplitude of the sine waveform. The frequency of the sinusoidal deviation in duty cycle, on the other hand, then corresponds to the rotational speed of the stepper motor drive shaft, where one sine wave cycle corresponds to one step. The higher the frequency of the sinusoidal variation of the H-bridge control waveform, the higher then will be the speed of the motor shaft. This configuration allows a direct voltage drive of the motor driver 54 and the switching circuit 68, which in turn allows the present invention to effectively function for any speed of the motor.

Direct, bipolar voltage drive is accomplished by driving each end of the stepper motor winding 60 out of phase with the other, and applying a 50 percent duty cycle of the PWM signal as a zero voltage drive condition. Greater than a 50 percent duty cycle will cause a positive current flow through the winding 60, while less than a 50 percent duty cycle will cause a negative current flow. By this configuration, there will be no additional need to switch the phase of the winding current. One side of the winding 60 is driven directly by the PWM signal (through the first driver 56), while the other side is driven (through the second driver 58) by an inverted PWM signal from the switching circuit 68 when PWM is present. This configuration allows the present invention to accomplish inversion through a simplified hardware circuit, what is typically required to be encoded in CPU software in the conventional method.

When direct voltage driving according to the present invention, a voltage is produced across the motor winding 60 when PWM is present, and each end of the winding is at an opposite phase. When PWM is not present (fails), however, the advantageous configuration of the switching circuit 68 also performs a PWM loss protection circuit.

PWM may fail when the CPU initializes and the instantaneous current is very high, or simply when the motor driver software stops for any reason. It is particularly important in such cases to protect the stepper motor 52 and the motor driver 54 from resultant high currents. The preferred configuration of the switching circuit 68 and charge pump 72 thus allows the charge pump to cease functioning when PWM is not present. In such a case, the second input 76 of the exclusive OR gate will go to "low," and the circuit 68 will act as a straight buffer. Accordingly, the voltage (high or low) applied to each end of the winding 60 will be the same, and no current will therefore flow across the winding, thereby preventing excessive currents in particular from harming the motor 52.

Direct voltage drive also allows a PWM master clock (not shown) to be derived from a stable crystal oscillator, which would not generally be usable in such a fashion according to the conventional method. As such, undesirable noise may be further reduced according to the present invention, and particularly as the drive voltage more closely approximates a pure sine wave, discussed below. The open loop configuration of the present invention also means that no feedback is necessary from the motor 52 to the CPU 62, or from the motor to the motor driver 54.

Direct voltage, open-loop driving also allows the present invention to avoid problems associated with use of closed-loop systems having current feedback. Excessive wiring required for feedback is avoided. Dead zone anomalies are corrected in the CPU 62 by pre-distorting the sinusoidal deviation in duty cycle such that the transition through the 50 percent duty cycle (zero) point occurs more rapidly at low shaft speeds. As the motor shaft speed increases, this effect is decreased and eventually removed as it becomes unnecessary. Such pre-distortion occurs real-time as the motor is running, and as a function of the motor shaft speed. It should be noted that this real-time function does not constitute a closed-loop, or feedback, control because the motor shaft speed is predicted by the stepper motor drive software, and not actually measured from the physical motor.

The predicted shaft speed is useful to compensate for other problems with stepper motor drivers identified by the present inventors. One such problem is that the effective sine wave drive amplitude must be increased with the drive frequency to overcome the increased winding impedance caused by inductance properties of the winding 60. As frequency increases, so does the winding impedance. If the drive amplitude is not increased with frequency, an increase in the shaft speed will result in a decrease in the torque of the motor 52, which is undesirable. The present invention automatically and advantageously compensates for this torque loss by using the predicted motor shaft speed to automatically adjust the duty cycle swing of the motor driver 54 (H-bridge).

Figure 4:
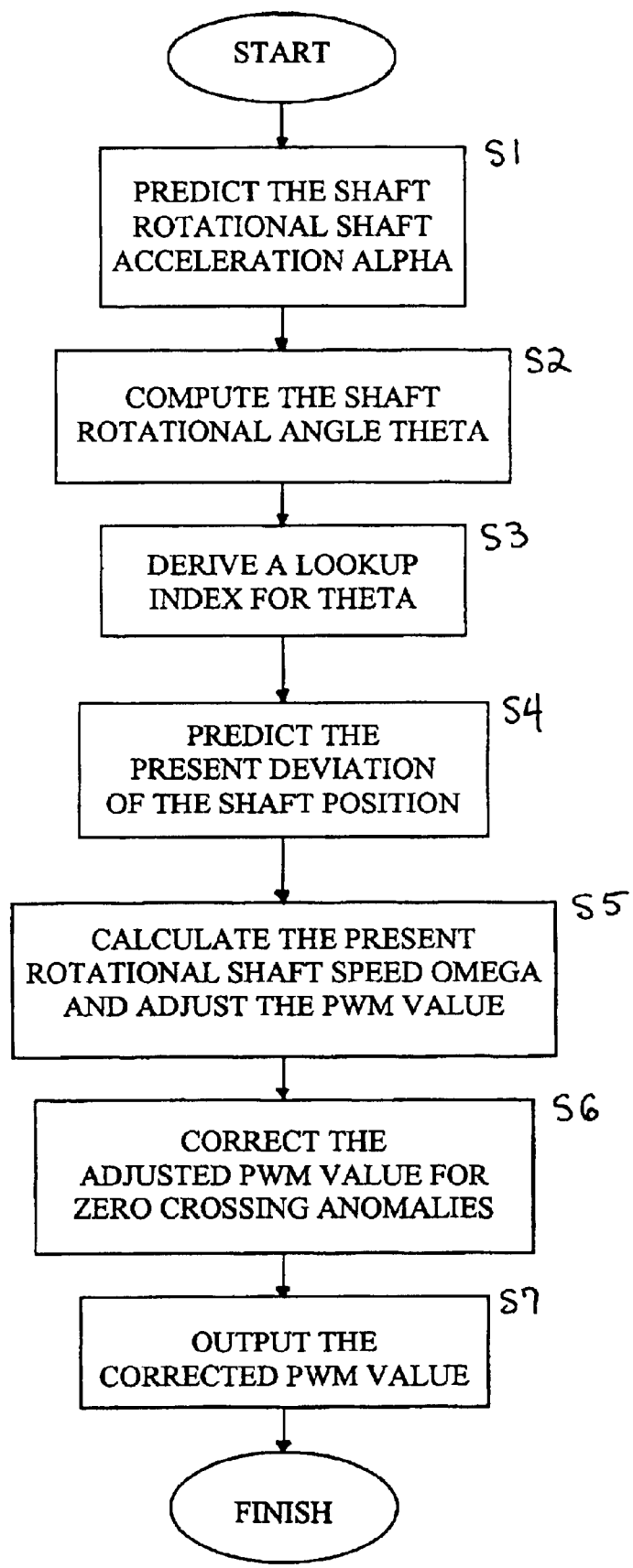
FIG. 4 is a flowchart diagram of a method of calculating a PWM value according to another embodiment of the present invention.

Referring now to FIG. 4, calculation of the adjustment to the PWM signal applied to the motor driver 54 (and switching circuit 68) is shown, as preferably performed by the software coding of the CPU 62, program memory 92, and/or sine table 94. The PWM voltage control signal preferably allows the stepper motor 52 to microstep with 1024 discrete steps per full motor step, to smoothly approximate a pure sine wave.

In step S1, the rotational acceleration (Alpha) of the motor shaft (not shown) of the motor 52 is predicted. The predicted value for Alpha is determined by an analysis of either the desired shaft angle versus the predictive deviated shaft angle for a position controller, or the desired shaft speed versus the predictive deviated shaft speed for a speed controller. These predictive deviational values are predetermined empirically, according to expected, known characteristics of the motor 52 itself, and are preferably accessed from the program memory 92 or sine table 94 by the CPU 62.

These desired values (position or speed) represent the ideal values the stepper motor system 50 should achieve operationally. The predictive values, on the other hand, represent the expected deviations seen for motor systems of these types. The present inventors though, have discovered that these predictive values adequately and accurately substitute for the actual, dynamically measured values of the rotational position and/or speed under normal driving speeds and driving loads for such stepper motor systems. While the present invention eliminates the need any actual, dynamic measurements during operation of such a device, one actual calibrating measurement is preferably performed at the initialization, or startup, of the device, to physically sense and calibrate the device prior to normal operation.

In step S2, the shaft rotational angle, or position (Theta), is computed. The shaft positional computation is based on the present rotational speed (Omega), the previous rotational position (Theta $_{LAST}$), and the desired acceleration Alpha. The following formula for the computation corresponds to the basic kinematics equation for computing a new position:

$$\text{Theta}=\text{Theta}_{LAST}+\text{Omega}*t+\tfrac{1}{2}\text{Alpha}*t^2$$

In step S3, a stepper sine table lookup index is derived from the computed new shaft position Theta. In a preferred embodiment, the internal variable for motor shaft position, Theta, is actually scaled $2^{12}$ (or 4096) times as large. The units for Theta are also preferably in microsteps, rather than degrees. According to this embodiment, Theta can be directly converted into an index from the sine table 94 simply by dividing Theta by 4096 (or, four times the number of microsteps per step).

In step S4, the present deviation of the shaft position is predicted. A desired motor coil voltage (for either phase of the motor winding 60) is accessed from the sine table 94. This accessed voltage is represented by a number called the Amplitude. The Amplitude is an eight-bit signed (positive or negative) number, and corresponds to the swing of the duty cycle, discussed above. In other words, the Amplitude is determined within the following boundaries:

$$-255<\text{Amplitude}<255$$

The variation of the Amplitude with shaft position Theta thus represents a pure (approximated) sine waveform. There are therefore 1024 entries in the sine table 94 for every full step of the stepper motor 52. In other words, the stepper motor 52 is microstepped with 1024 microsteps per full step.

In, step S5, the present rotational shaft speed Omega is calculated according to the predicted shaft acceleration Alpha, and the predicted deviation of the shaft position (PWM value) is adjusted based on the calculated speed Omega. First, a PWM Frequency Adjustment is determined by multiplying the Amplitude, obtained from the sine table 94, by a calculated Scale Factor. The Scale Factor is based upon the calculated shaft speed Omega, and dynamically changes as a function of the shaft speed according to the following formula:

$$\text{Scale Factor} = \text{Base Level} + (\text{Slope} * \text{Omega})$$

The Scale Factor compensates for the torque loss, described above, to keep the torque of the motor generally constant as speed varies. The Base Level and the Slope are both empirically determined characteristics of the stepper motor 52 itself. The Base Level determines the motor current at a shaft speed of zero. The Slope is a factor to compensate for the inductive components of the impedance through the winding 60. This impedance increases as the drive frequency increases, being a linear function of the winding inductance. The effect of the Slope therefore is to keep the coil current relatively constant as the speed varies. The calculated Scale Factor is a thus a linear function of the motor rotational shaft speed, adjusted for impedance induction and scaled for a constant motor torque.

It is important to note that the exact value of the maximum coil current is dependant on both a power supply voltage, and the shaft speed Omega. The nature of the electronics for drivers of this type is such that, at a particular power supply voltage, the current in the motor coils typically increases as the shaft speed decreases, due to the inductive component of the motor windings. The software calculations shown here, on the other hand, automatically correct for this current effect "on the fly" by adjusting the Scale Factor as a function of the shaft speed Omega. The Scale Factor starts as the minimum value Base Level, and then increases as a function of the shaft speed.

The PWM Frequency Adjustment can then be calculated according to the following formula:

$$PWM \text{ Frequency Adjustment} = \text{Amplitude} * \text{Scale Factor}$$

The Adjusted PWM Value is then easily determined from the PWM Frequency Adjustment as follows:

$$\text{Adjusted } PWM \text{ Value} = PWM \text{ Midpoint} + PWM \text{ Frequency Adjustment}$$

The PWM Midpoint is the PWM value at the 50 percent duty cycle (zero swing), described above. The PWM Frequency Adjustment is therefore a positive or negative number, representing the amount of swing from the 50 percent duty cycle midpoint.

In step S6, the Adjusted PWM Value is corrected for zero-crossing anomalies. This correction accounts for the dead zone anomaly, described above, that occurs when the voltage waveform of the stepper motor crosses the zero point, or 50 percent duty cycle. The zero cross correction (Z-Fix) is an intentional distortion factor that is dynamically applied "on the fly" to the Adjusted PWM value before it is output to the motor driver 54 (and switching circuit 68). The Z-Fix correction factor compensates for the effects of the noticeable dwell experienced by the motor shaft at slower rotation speeds when crossing the zero point (reversing duty cycle).

First, a Zero Scale Factor is determined according to the following formula:

$$\text{Zero Scale Factor} = \text{Zero Base Level} - (\text{Zero Slope} * \text{Omega})$$

The Zero Base Level and the Zero Slope characteristics are empirically determined for the motor 52 itself, similarly to the Base Level and the Slope in step S5. The Zero Scale Factor though, can never be a negative number. The Zero Scale Factor will always equal zero whenever the product of Omega and the Zero Slope equals or exceeds the Zero Base Level Factor. In other words, the Zero Scale Factor disappears at high rotational shaft speeds (large Omega).

The actual zero cross correction factor Z-Fix can then be calculated as a function of the Amplitude and the Zero Scale Factor:

$$Z\text{-Fix} = \text{Zero Scale Factor} - ((\text{Zero Scale Factor}/255) * \text{Amplitude})$$

As shown in the formula, the Zero Scale Factor is first divided by 255 (which is the maximum value of the sine table 94) before being multiplied with the Amplitude. The correction factor Z-Fix is therefore a function of both the lookup value from the sine table 94 and the shaft speed Omega but, as noted above, Z-Fix will decrease as the speed increases, and be zero at very high shaft rotational speeds.

Z-Fix is then added to the Adjusted PWM Value to get a Corrected PWM Value:

$$\text{Corrected } PWM \text{ Value} = \text{Adjusted } PWM \text{ Value} + Z\text{-Fix}$$

At high rotational speeds, therefore, the Corrected PWM Value will simply be equal to the Adjusted PWM Value. The output software here corrects for the slow-speed, zero-cross effect by pre-distorting the waveform near the zero crossing point. Since this correction is only needed at low speeds, the pre-distortion is eventually removed as the motor shaft speed increases.

In step S7, the Corrected PWM Value is output to the motor drive 54 (and the switching circuit 68) as a present PWM signal.

As illustrated above, this embodiment of the present invention advantageously corrects for several anomalies typically encountered with motors and drivers of these types. Through software control in the CPU 62, the present invention is able to effectively compensate for increased winding current by keeping the winding current relatively constant versus the shaft speed. The present invention also effectively compensates for zero crossing dead zone anomalies, which are particularly noticeable at low operating speeds of the motor. The correction features described herein also correct for the noticeable effects that appear when such devices operate at speeds which produce a natural resonance.

According to these features of the present invention, a stepper motor can be quietly and smoothly driven over a continuous range of operating speeds. An operator is not limited to single, or discrete, operating speeds or frequencies predetermined by other conventional devices.

While particular embodiments of the driving circuits and methods of the present invention have been shown and described herein, it will be appreciated by those skilled in the art that changes and modifications may be made thereto without departing from the invention in its broader aspects and as set forth in the following claims.

What is claimed is:

1. A driver circuit for a stepper motor in conjunction with a processor outputting a PWM signal, the driver circuit comprising:
   an H-bridge circuit having first and second inputs, said first H-bridge input connecting to the output PWM signal from the processor; and
   a switching circuit having an input and an output, said switching input connecting to the output PWM signal from the processor, and said switching output connecting to said second H-bridge input,
   wherein said switching circuit performs an inversion of a duty cycle of the PWM signal when the PWM signal is present, and a non-inversion of said duty cycle when the PWM signal is not present.

2. The driver circuit as defined in claim 1, wherein the driver circuit is configured to be open-loop.

3. The driver circuit as defined in claim 1, wherein said switching circuit includes an exclusive OR gate.

4. The driver circuit as defined in claim 1, wherein said switching circuit includes a charge pump.

5. The driver circuit as defined in claim 4, wherein said charge pump shuts down when the PWM signal is not present.

6. A stepper motor system, comprising:
   a stepper motor;
   a motor driver circuit to drive said stepper motor, said motor driver circuit having first and second driver inputs;
   a switching circuit having a switching input and a switching output, said switching input connecting to said first driver input and said switching output connecting to said second driver input;
   a processor outputting a PWM signal to said first driver input and said switching input; and
   said switching circuit functioning as an inverting circuit when said PWM signal is present, and as a buffer circuit for said motor driver circuit when said PWM signal is not present.

7. The stepper motor system as defined in claim 6, wherein the system functions as an open-loop system.

8. The stepper motor system as defined in claim 7, wherein said processor dynamically corrects said PWM signal at low speeds of a shaft of said stepper motor.

9. The stepper motor system as defined in claim 8, wherein a rotational position of said motor shaft is calibrated at an initialization or startup of the system.

10. The stepper motor system as defined in claim 6, wherein said motor driver circuit comprises and H-Bridge.

11. The stepper motor system as defined in claim 6, wherein said switching circuit comprises an exclusive OR gate.

12. The stepper motor system as defined in claim 6, further comprising:
    a program memory accessible by said processor; and
    a sine table accessible by said processor.

13. The stepper motor system as defined in claim 12, wherein said sine table stores an approximated pure sine wave.

14. The stepper motor system as defined in claim 6, wherein said buffer circuit substantially prevents current flow through said motor driver circuit and windings of said stepper motor when said PWM signal is not present.

15. The stepper motor system as defined in claim 6,
    wherein said PWM signal includes a duty cycle,
    wherein 50 percent of said duty cycle represents a zero voltage across windings of said stepper motor,
    wherein zero percent of said duty cycle represents a maximum current through said windings in a first direction, and
    wherein 100 percent of said duty cycle represents a maximum current through said windings in a second direction opposite to said first direction.

16. The stepper motor system as defined in claim 15, wherein first and second current directions are switched at a rate of approximately 19.5 kHz.

17. The stepper motor system as defined in claim 6, wherein said motor driver circuit is a direct voltage drive circuit.

18. The stepper motor system as defined in claim 6, further comprising a PWM master clock derived from a stable crystal oscillator.

19. The stepper motor system as defined in claim 6, wherein one step of said stepper motor is equal to one cycle of a sine wave, and includes 1024 microsteps per step.

20. A method for driving a stepper motor having a motor driving circuit for driving the stepper motor, comprising the steps of:
    predicting a rotational acceleration of a rotatable shaft of the motor;
    computing a shaft rotational position based on said predicted shaft acceleration;
    predicting a present deviation value of said computed shaft position based on said computed shaft position;
    computing a rotational speed of said motor shaft based on said predicted shaft acceleration;
    adjusting said predicted present deviation value based on said computed shaft speed;
    correcting said adjusted deviation value for a zero-crossing anomaly; and
    outputting said corrected deviation value to the motor driving circuit.

21. The driving method as defined in claim 20, wherein said corrected deviation value is output as a PWM signal in said outputting step.

22. The driving method as defined in claim 20, wherein an amount of correction in said correcting step decreases as said computed shaft speed increases.

23. The driving method as defined in claim 22, wherein said corrected deviation value is equal to said adjusted deviation value at high rotational shaft speeds.

24. The driving method as defined in claim 20, wherein in said acceleration predicting step, said acceleration is determined on the basis of at least one of a desired shaft angle versus a predictive deviated shaft angle for a position controller, and a desired shaft speed versus a predictive deviated shaft speed for a speed controller.

25. The driving method as defined in claim 24, wherein said predictive deviated shaft angle and speed are determined empirically.

26. The driving method as defined in claim 20, wherein in said shaft position computing step, said shaft position is computed to be equal to a sum of a previous shaft position, a product of a predicted shaft speed and time, and one half of a product of said predicted shaft acceleration and time squared.

27. The driving method as defined in claim 26, wherein said computed shaft position is divided by 4096 to derive a sine table lookup index.

28. The driving method as defined in claim 20, wherein in said adjusting step, said computed shaft speed is first compensated for at least one of a current flow through windings of the stepper motor at zero shaft speed, and inductive components of said windings.

* * * * *

UNITED STATES PATENT AND TRADEMARK OFFICE
CERTIFICATE OF CORRECTION

PATENT NO. : 6,903,531 B2
DATED : June 7, 2005
INVENTOR(S) : Suomi et al.

It is certified that error appears in the above-identified patent and that said Letters Patent is hereby corrected as shown below:

Column 10,
Line 66, insert the following:
-- 29. The driving method as defined in claim 28, wherein a torque of the stepper motor is kept generally constant over a continuous range of rotational shaft speeds. --.

Signed and Sealed this

Thirty-first Day of January, 2006

JON W. DUDAS
*Director of the United States Patent and Trademark Office*